Nov. 4, 1958
R. F. CORLISS
2,858,939
SEWAGE DISPOSAL SYSTEM
Filed May 10, 1956
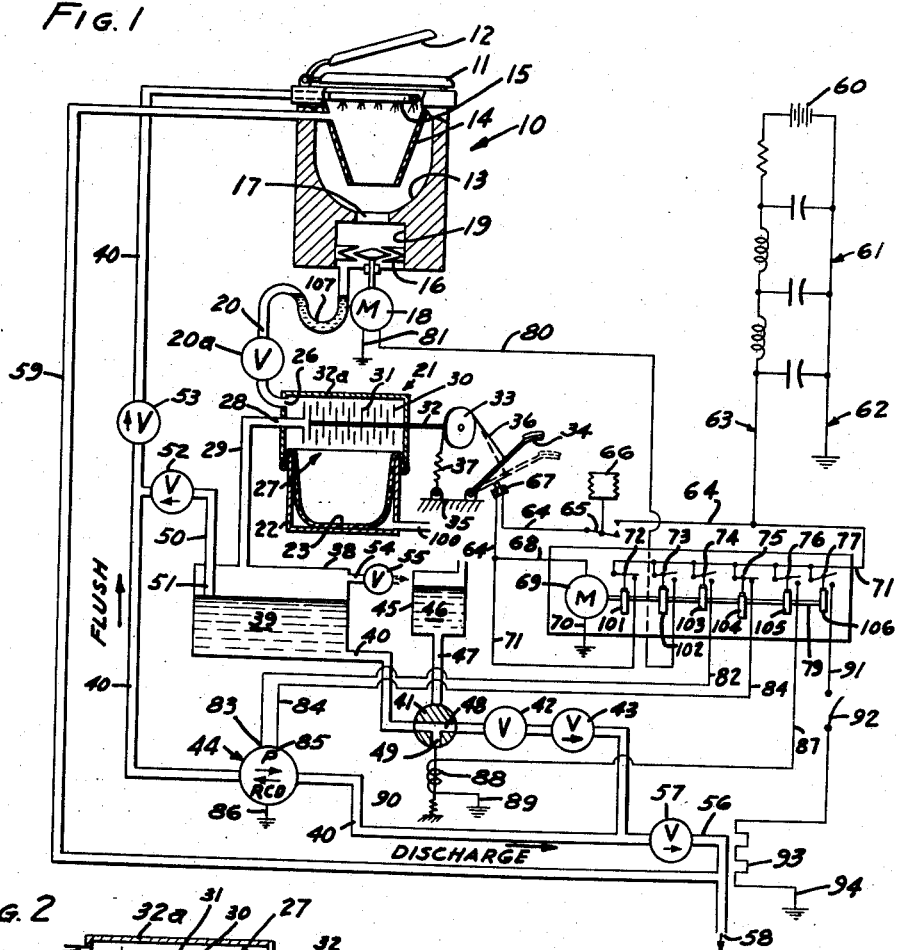
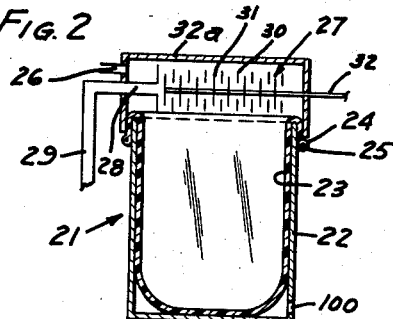
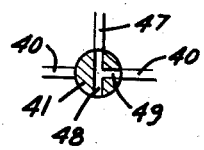
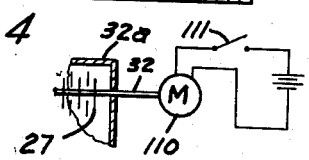
INVENTOR.
ROBERT F. CORLISS
BY
D. Gordon Angus
ATTORNEY.

United States Patent Office 2,858,939
Patented Nov. 4, 1958

2,858,939

SEWAGE DISPOSAL SYSTEM

Robert F. Corliss, Pasadena, Calif., assignor to Wickland Manufacturing Company, Pasadena, Calif., a corporation of California Application May 10, 1956, Serial No. 584,019

12 Claims. (Cl. 210—136)

This invention relates to sewage disposal systems, and particularly to a sewage disposal system suitable for use in aircraft.

Many problems are encountered in the disposition of sewage products from aircraft which are significantly different from sewage disposal problems encountered in ground installations. In the early days of flying it was common practice simply to dump the sewage overboard relaying on buffeting by the air to reduce the sewage to small pieces and droplets before the material reached the ground. That practice has been abandoned and aircraft now commonly utilize a retention system, wherein a reservoir containing a quantity of liquid with disinfectant and odor-masking perfume receives the sewage. The sewage is retained in the reservoir for later disposal on the ground. That system is esthetically undesirable. It is unsightly and malodorous. There is either a sewage small, or a strong perfumed odor to mask the sewage small, both of which are unpleasant.

A retention system is undesirably heavy, since it is necessary to provide a large volume and weight of liquid in the reservoir to receive, cover and disinfect the sewage. This liquid has to be retained in the aircraft, along with all of the sewage, for the whole flight.

It is an object of this invention to provide a sewage system in which a commode may be kept clear of sewage, and in which any retained sewage solids may be kept away from contact with air, thereby reducing odors.

A further object is to provide a system which requires a minimum quantity of liquid in storage.

It is an additional object of this invention to provide an over-all system of decreasing weight, whereby the sewage is processed so that its fluid may be discharged from the aircraft, only the solids being retained, thereby discharging weight from the airplane when the device is used. Diminution of weight is of considerable importance, inasmuch as it has been calculated that an additional pound carried by an aircraft for one year may cost as much as three hundred dollars. Any weight saving expedient which also improves esthetic conditions for the passengers is doubly advantageous.

This invention is carried out by providing a sewage system which includes a grinder for reducing the sewage to a slurry, a receptacle for receiving the slurry, a means for filtering the slurry to retain the solids and pass the liquids thereof, a flushing reservoir for providing the liquid necessary for creating the slurry, and a pump to convey liquids from the flushing reservoir to the grinder.

According to a preferred embodiment of the invention liquids from the receptacle are discharged into the flushing reservoir so they can be recycled to the grinder. As liquids are added to the system such as by addition of urine and the liquid content of sewage, the excess liquid is discharged from the flushing reservoir, and only enough retained to carry out the flushing operation, and reduction to a slurry.

A preferred but optional feature of this invention resides in the provision of automatic cycling means whereby the device may be sequentially actuated.

The above and other features of this invention will be fully understood from the following detailed description and the accompanying drawings, of which:

Fig. 1 is a view partly in schematic notation showing a sewage system;

Fig. 2 is a side elevation, partly in cut-away cross-section of a part of the apparatus of Fig. 1;

Fig. 3 is a fragmentary illustration, partly in schematic notation showing another condition of a part of the system of Fig. 1; and Fig. 4 is a fragmentary view, partly in schematic notation, showing another means for actuating filter means in this system.

In Fig. 1 there is illustrated the presently preferred embodiment of the invention in which a commode 10 is provided for the reception of sewage. This commode is provided with a toilet seat 11 and a tight fitting cover 12 thereon. A receiving chamber 13 is provided beneath the seat. A funnel-shaped splash guard 14, is fitted in the receiving chamber below the seat. A spray ring 15 is disposed beneath the seat, and above the splash guard so as to discharge liquids to wash the splash guard clean. Liquid from the spray ring flushes the sewage into a grinder 16. The grinder is operated by means of a motor 18, and may be of any desired construction capable of reducing the sewage particles to a slurry. Commonly known garbage grinders are a suitable example. The grinder operates within a grinding chamber 19.

A slurry conduit 20 receives the slurry from the grinder and conducts it to a filter assembly 21. This filter assembly comprises a lower container 22 (see Fig. 2) within which is placed a flexible, open-top receptacle 23. This receptacle has a hemmed edge 24 with a draw string 25 inside, and resembles a "money bag." The draw string serves to close the receptacle when removed from the container, and provides means for carrying it. The slurry enters the filter assembly through a slurry inlet 26 to discharge into the flexible receptacle 23. A manual shut-off valve 20a is incorporated in slurry conduit 20.

A leaf type filter 27, which is preferably of the type commonly known as a "Cuno" filter is placed inside the filter assembly. This filter has a filtrate outlet 28 communicating with the center thereof, which empties into the filtrate conduit 29. Cuno filters are well known. They comprise a plurality of closely spaced leaves 30 which will pass fluid but not solids between them. Solids which accumulate on the outside of said leaves are scraped away by scraper blades 31 which are disposed between the leaves, and which are attached to a rotatable scraper rod 32, inside the leaves 30. Turning this rod moves the scraper blades in a circular path between the leaves, and thereby cleans the filter. Many other types of filter means may be used, although it is preferable to use a self-cleaning type. Sewage tends to clog the passages in most filters, and it has been found that a leaf-type self-cleaning filter such as the Cuno filter gives best results.

The filter means may conveniently be made integral with the top 32a of the filter assembly. The top 32a is fitted tightly onto the lower container 22, and the receptacle's upper edge may conveniently be folded over the upper edge of said lower container. An air-tight joint is thereby achieved. A hole 100 is drilled in the side of the lower container below the upper edge, preferably near the bottom.

A drive pulley 33 is attached to the scraper rod 32 for rotating said rod and scraper blades. A flush pedal 34 which is pivoted to the floor 35 or some other structure is connected to the drive pulley by means of a cable 36 which is attached to the pedal and wrapped around the drive pulley 33. This pedal is maintained in an elevated position by means of a spring 37 which is attached to the cable and to the floor. Depressing the flush pedal will turn the scraper rod and thereby clean the filter.

The filtrate conduit 29 discharges into a flushing reservoir 38. This flushing reservoir holds a body of flushing liquid 39. The flushing reservoir discharges into a flushing conduit 40, which conduit is connected to the bottom of the reservoir. A selector valve 41, which may be a two-position, three-way valve is incorporated in the flushing conduit. The flushing conduit 40 is connected to the spray ring 15, so that liquid from the flushing reservoir can be sprayed into the splash guard and thence flow to the grinding chamber 19.

A manual valve 42 is placed in the flushing conduit 40 on the opposite side of the selector valve from the flushing reservoir, as is a check valve 43. Check valve 43 permits flow from the flushing reservoir 38 to the spray ring, but prevents reverse flow.

A reversible, bi-directional pump 44, which may be a positive displacement, vane type, is disposed in the flushing conduit between the spray ring and the flushing reservoir. It has been found that maximum pump wear results from using nylon vanes.

A disinfectant reservoir 45 containing liquid disinfectant 46 discharges through a disinfectant conduit 47 into the selector valve 41. The selector valve 41 is provided with a straight-through passage 48 and a side-tapped passage 49 so as to provide for three-way flow.

The disinfectant liquid 46 may serve two purposes. The first is the deodorizing and disinfecting of the sewage liquids. The second is for dyeing the color of the circulating liquids. Because this system recirculates urine and other sewage liquids, in addition to liquids originally contained in reservoir 38, the color of the recirculated liquid soon becomes distasteful unless masked. In order to carry out these functions, it has been found that a suitable composition for one pint of liquid 46 is as follows: 4 fluid onces of Chlorosan, manufactured by the Los Angeles Chemical Company, Los Angeles, Calif., containing 66% dichlorobenzene, 6% pine oil, 10% anhydrous soap, and 18% inert ingredients. 12 fluid ounces of Clondex Concentrate, manufactured by Colors Unlimited, Los Angeles, Calif., which is a brownish colored dye which turns the sewage liquids a milky white when added thereto.

The Chlorosan deodorizes and disinfects, while the Clondex dyes the color of the liquids. If only disinfecting is desired, the dye may be omitted. If only dyeing is desired, the disinfectant may be omitted.

An effluent siphon conduit 50 has a standpipe 51 extending downward into the flushing reservoir to a predetermined level. The level of this standpipe determines the quantity of liquid retained in the reservoir. The effluent siphon connects to flushing conduit 40. A check valve 52 is disposed in said effluent siphon conduit so as to permit flow from the flushing reservoir into the flushing conduit but not the reverse thereof.

A check valve 53 is disposed in the flushing conduit 40 between the spray ring and the junction of the effluent siphon and the flushing conduit, which check valve permits flow toward the spray ring but not the reverse.

An overflow conduit 54 is disposed near the top of the flushing reservoir. A manual valve 55 is provided for controlling flow through this conduit.

An effluent discharge conduit 56 discharges from the flushing conduit 40 between the pump and the selector valve. A check valve 57 in this effluent discharge conduit permits flow out of said flushing conduit but not into the same. This effluent discharge conduit discharges overboard from the airplane through an overboard vent 58. The overboard vent 58 connects with a vent conduit 59, said vent conduit making a direct connection with the commode so as to vent the region inside the commode and remove undesired odors. It has also been found that this venting is sufficient to prevent freezing of liquid in the overboard vent 58.

Power and control means are provided for operating the components of this device in sequential order. For this purpose, there is provided a power source 60 which may be the aircraft bus bar, for example. A radio filter 61 is placed in the circuit for shielding the aircraft system from undersirable interference caused by feedback of electrical impulses. The power source is grounded at 62, and a lead 63 passes from the power source to control means.

Lead 63 has a branch 64 which includes an altitude switch 65. This altitude switch may conveniently be actuated by an aneroid bellows 66 so that the switch will be opened at high pressures and closed at low pressures. This assures that the system cannot be actuated while the aircraft is on the ground, but can be actuated at the lower pressures encountered at higher altitudes. Lead 64 also includes a starting switch 67 which may conveniently be a microswitch fixed to the aircraft frame, and which is contactible by the flushing pedal 34 when the pedal is depressed. Lead 64 branches to form branch leads 68 and 71. Branch lead 68 passes to a timer motor 69. Lead 70 grounds the timer motor. Branch lead 71 incorporates a holding switch 72. Said branch lead 71 connects with one terminal of each of the following switches: grinder switch 73, flushing switch 74, effluent discharge switch 75, and selector valve switch 76. If desired, an overboard vent heater switch 77 may also be provided, and one of its terminals connected to branch lead 71. The switches are actuated by cams which are mounted to a cam shaft 79. The cam shaft is turned by the timer motor. Cam 101 actuates holding switch 72. This cam is so shaped and attached to the cam shaft that switch 72 is held closed until an entire flushing operation is concluded. By holding switch 72 closed, current is provided to the timer motor through lead 71, even when the circuit through lead 64 is open, after releasing the flush pedal.

Grinder switch 73 is connected by a lead 80 to a terminal of the grinder motor 18. The other terminal of the grinder motor is grounded by lead 81. Grinder switch 73 is operated by cam 102.

The flushing switch 74 is connected by lead 82 to one terminal 83 of reversible pump motor 44, while the effluent discharge switch 75 is connected by lead 84 to a second terminal 85 of said pump motor. A lead 86 provides a ground for both power circuits of the pump motor. Current flowing through lead 82 causes the pump to pump liquid through the flushing conduit from the reservoir 38 or 45 to the spray ring 15. This current is controlled by flushing switch 74, which is actuated by cam 103.

Current flowing through lead 84 reverses the pump direction and pumps liquid in the opposite direction. This reverse flow is controlled by switch 75, which is operated by cam 104.

Selector valve 41 is mechanically linked to solenoid 88. The solenoid controls the position of selector valve 41. Lead 87 connects the selector valve switch 76 to the solenoid and lead 89 grounds the solenoid coil. The solenoid has two positions. One is a rest position assumed when current is not passing through lead 87. When the current is off, spring 90 moves the valve to the position shown in Fig. 1. In that position, the selector valve permits flow from the reservoir 38 to the pump. In the selector valve position caused by actuating the solenoid, the selector valve is moved to the position shown in Fig. 3, wherein the reservoir 38 is cut out of, and the disinfectant reservoir 45 is cut in to conduit 40. The actuated position occurs when switch 76 is closed, and this switch is operated by cam 105.

If a heater is needed to heat the overboard vent 58, a lead 91 will be connected to outlet heater switch 77. This lead 91 may incorporate a thermostat element 92 which opens said lead 91 when the temperature of the overboard is above freezing, and vent heating is therefore unnecessary. The outlet heater 93 is grounded by lead 94. Outlet heater switch 77 is operated by cam 106. Said outlet heater is disposed adjacent to, or even inside, overboard vent 58 if desired.

Fig. 4 shows an alternate means for cleaning the filter means 27. The same rod 32, rather than being turned by a cable and pulley, is connected to the shaft of a motor 110. When the filter is to be cleaned, switch 111 may be closed, and the rod 32 will thereby be turned.

The operation of the device will now be described. The system of Fig. 1 is shown in repose, with the selector valve 41 connecting the flushing conduit to the flushing reservoir, and the solenoid 88 not actuated. In this condition, the liquid 39 from the flushig reservoir 38 could be pumped to the spray ring 15. Manual valve 20a is open.

The flushing cycle is started by stepping on the flush pedal 34. This pulls cable 36, which rotates the drive pulley 33 and turns the scraper rod 32. This rotation causes the scraper blades 31 to dislodge solids from the outside of the leaves 30 in the Cuno filter, thereby clearing the filter for another filtration operation. The depressed pedal contacts the starter switch 67, and when the altitude switch 65 is closed by the aneroid, current from lead 63 flows through leads 64 and 68 to start the timer motor 69.

As soon as the timer motor turns slightly, cam 101, associated with holding switch 72, closes the circuit through lead 71, so that the timer motor continues to turn after the flush pedal is released and starter switch 67 is opened. The holding switch keeps power on the timer motor until a full flushing cycle has been carried out, at which time the holding switch is permitted to open and the timer stops.

As the timer motor turns, its camshaft 79 rotates so that the selector valve switch 76 is first actuated to turn the selector valve 41 to the position shown in Fig. 3. At this time, flushing switch 74 is closed so that disinfectant liquid 46 is pumped from the disinfectant reservoir to the spray ring. After a period of duration determined by cam shaft speed and the shape of cam 105 during which disinfectant liquid is pumped to the spray ring and discharged into the commode, cam 105 releases switch 76, and the selector valve is returned by spring 90 to the position shown in Fig. 1.

With the flushing switch 74 still held closed by its cam 103, flushing liquid 39 is withdrawn from the flushing reservoir and pumped to the spray ring from which it is discharged into the commode. At this time, the grinder switch 73 is closed by cam 102, and the grinder reduces the sewage which is diluted with disinfectant liquid 46 and flushing liquid, to a slurry. The pump continues delivering flushing liquid to the commode for a predetermined time, to provide sufficient liquid to reduce an average load of sewage to a slurry and to wash the commode clean. Thereafter, the cams operating the grinder switch 73 and the flushing switch 74 permit these switches to open.

During the operation just described, the slurry has passed from the grinder 16 through the slurry conduit 20 and into the filter assembly 21 where it has been captured in the flexible receptacle 23. This receptacle, which need only be large enough to hold the solid contents of an anticipated volume of sewage for a given aircraft trip, soon fills with slurry. The filter assembly is therefore full, and fluid passes through the Cuno filter, between its leaves, to the effluent conduit 29.

The Cuno filter holds the solids inside the filter assembly where they fall back into the flexible receptacle 23. The effluent liquids return through effluent conduit 29 to the flushing reservoir 38, where they are again available as flushing liquid.

It will be understood that this flushing liquid will, over a period of time become contaminated with the fluid content of the sewage. However, the disinfectant in the disinfectant liquid 46 will be sufficient in strength and quantity to reduce and mask the odor to unobjectionable levels, and the dye will serve to change the color to an esthetically unobjectionable shade.

After the operation just described, the cam shaft continues to turn, and cam 104 closes the effluent discharge switch 75. This sends current through lead 84, and reverses pump 44. The pump then draws liquid from the stand pipe 51 into the flushing conduit, and through the flushing conduit through the overboard vent 58. Excess liquid introduced into the system over that required for flushing is disposed of overboard in this manner, the quantity retained in the reservoir 38 being determined by the level of the stand pipe.

Check valves 43, 52 and 53 operate together to prevent pump 44 from dumping liquid into reservoir 38. Check valves 43 and 53 operate together to permit liquid to be withdrawn from reservoir 38.

After a time which is determined by the rate of the timer motor and the shape and positioning of the cams, the effluent discharge switch is released by the cam which holds it closed, and the flushing sequence is thereby completed. At this time, cam 101 also releases switch 72, thereby breaking the source of power to the timer motor and inactivating the system until the flush pedal is depressed again.

In installations where the overboard vent 58 is heated, cam 106 is provided on the cam shaft for closing the outlet heater switch 77. In the event the outlet temperature is below freezing, as determined by the thermostat 92, current through switch 77 causes the outlet heater 93 to warm the overboard vent while liquid is discharged therefrom, so that the vent is not clogged by frozen effluent fluid.

A further feature of this invention resides in means for expressing some of the liquid from the sewage solids in the flexible receptacle, so that when the device is to be emptied and cleaned, only solids with a minimum of liquid need be handled. For this purpose, the port 100 in the side of the lower container 22 vents the outside bottom of the flexible receptacle 23 to ambient pressure.

In expressing the liquids, the manual valve 42 is closed so that no additional liquid can be drawn from either of the reservoirs, and manual valve 20a is closed to provide a hermetic seal beneath the top 32a of the filter assembly. Then the flush pedal is stepped on to close the starting switch. The altitude switch 65 may be held manually closed to start the system. The timer motor then begins to turn.

The flushing system is inactivated by valve 42 during and while the timer causes the pump to pump toward the spray ring. When cam 104 closes the effluent discharge switch 75, then the pump reverses and pumps excess fluid out of the flushing reservoir 38. After the pump working in its reverse direction to pump excess liquid overboard, lowers the level of the flushing reservoir to the bottom of stand pipe 51, then the low pressure created by the pump 44 is transmitted through the effluent conduit 29 so as to exert a sub-atmospheric pressure inside the Cuno filter and thereby inside the filter assembly above the flexible receptacle. This exerts differential pressure upon the flexible receptacle and forces the flexible bag toward the Cuno filter. This presses the solids firmly against the Cuno filter, thereby expressing the fluid out of the retained solids and through the Cuno filter. The flexible receptacle thus retains principally solids. The amount of liquids retained in the filter assembly is reduced to a minimum. The excess liquid expressed from the solids is dumped into the flushing reservoir where it is removed by action of the pump and dumped overboard.

When the timer has made its full turn, and the fluids are expressed from the solids, the timer will shut off. The top of the filter assembly may then be removed and shaken so that the solids fall from the Cuno filter into the flexible receptacle. Then the draw string is pulled to close the top of the receptacle 23 and the accumulated sewage solids may be carried elsewhere for final disposal.

The motor 110 in Fig. 4 is provided for cleaning the filter in the event the mechanical connection of Fig. 1 is not desired. To clean the filter, switch 111 need only be closed. Cam means could be provided in the timing means for this purpose.

Several modifications of the system may be made. For example it may not be desired to provide the system for an effluent discharge in connection with a reversal of the pump motor. In this event, the lead 84 may be disconnected or eliminated and the conduit 54 can be used as a direct overflow through the manual valve 55.

In the system shown in Fig. 1, any extra fluid such as urine, or the liquid content of solid sewage is simply pumped overboard during the effluent discharge cycle to the overboard vent. It will be further appreciated that the constituents of the flushing fluid will gradually change because new liquids such as urine will be added. These will be partially used as flushing liquids, and partly discharged overboard.

This system is a system of decreasing weight, inasmuch as a volume of liquid equalling the volume of the disinfectant is discharged overboard at each flushing cycle, plus an amount equal to the volume of urine and fluid content of the sewage. Therefore the aircraft will become lighter with each toilet use.

It will further be observed that, contrary to retention systems, only a relatively small amount of fluid must be kept in the flushing reservoir, it being found that approximately one gallon of flushing fluid is necessary for each flushing cycle, as opposed to the five and ten gallons contained in retention systems. During any flushing cycle, it is possible to recirculate the liquid. Therefore, it is possible to provide a complete flushing system with less than the total amount of liquid necessary for a flush.

The trap 107 keeps odors from the solid material of the sewage in the filter assembly from rising in the commode. The only exposed area is that of the cross-section of slurry conduit 20. This cross-section may be kept small. Only a small area of flushing liquid is exposed to the air to cause any odor, and that odor is largely dispelled by means of the vent conduit 59. This is a significant improvement over retention systems, in which the entire large surfaces of a considerable volume of liquid which contains sewage will be exposed to the air. This air rises directly to the nose of persons using the commode in present aircraft lavatory installations, and is unpleasant. The system of this invention therefore minimizes odors and makes latrines in aircraft less objectionable. Also, dye, if used in the disinfectant liquid will make the color of the flushing liquid tolerable.

This invention is not to be limited by the embodiment shown in the drawings and described in the description, which is given by way of example and not of limitation, but only in accordance with the scope of the appended claims.

I claim:

1. A sewage treatment system comprising: a grinder for receiving and grinding sewage; a receptacle; slurry conduit means discharging from the grinder into the receptacle; a flushing reservoir; filtrate conduit means discharging from the receptacle into the flushing reservoir; filter means in said filtrate conduit and within said receptacle for filtering out solids, whereby solids are retained in said receptacle; a flushing conduit discharging from the flushing reservoir into the grinder; a reversible pump in said flushing conduit between said flushing reservoir and the grinder for pumping liquid from the reservoir to the grinder in one of its pumping directions; an effluent conduit interconnecting an upper region of the flushing reservoir to the flushing conduit at a point between the grinder and the pump; a discharge conduit discharging from the flushing conduit between the flushing reservoir and the pump; a check valve permitting flow in the effluent conduit in the direction away from the flushing reservoir but not the reverse; a check valve in the said discharge conduit permitting flow away from the flushing conduit but not in the other direction; and a check valve in the flushing conduit between the connection of the flushing conduit with the effluent conduit and the grinder permitting flow toward the grinder, but not in the other direction; whereby when the pump is actuated so as to pump fluids toward the grinder, liquid is withdrawn from the reservoir and pumped through the flushing conduit to the grinder and when the pump is reversed, fluid is withdrawn from the upper portion of the reservoir and pumped out the discharge conduit.

2. Apparatus according to claim 1 in which a filter assembly is provided, in which the said receptacle forms one part thereof and said receptacle includes a flexible portion, said filter assembly including a lid attachable to said receptacle for making an air tight enclosure therewith; said filter means being contained in said enclosure, said slurry conduit discharging into said enclosure and said filtrate conduit discharging from said filter means, whereby a differential pressure on said flexible portion causes the said receptacle to contract, thereby compressing the contents of the receptacle upon the filter means and forcing the fluid portion therethrough.

3. Apparatus according to claim 2 in which the filtrate conduit and the said effluent conduit are both in communication with the upper portion of the flushing reservoir, whereby, after the pump has withdrawn all available fluid from the flushing reservoir, it exerts a negative pressure on the effluent conduit for creating a differential pressure on said receptacle, the outside of the flexible portion being vented.

4. Apparatus according to claim 3, in which said filter is a leaf type filter.

5. Apparatus according to claim 3 in which a first shut-off valve is placed in said slurry conduit and a second shut-off valve is placed in said flushing conduit between the flushing reservoir and the point of connection of said discharge conduit to said flushing conduit, whereby said slurry conduit and said flushing conduit can be closed by the respective shut-off valve connected in said conduits.

6. Apparatus according to claim 5 in which a control means is provided for the said sewage treatment system, which control means includes: a timer motor, a camshaft driven by said timer motor, cams on said camshaft, and a switch actuated sequentially by each cam, there being a flushing switch for actuating said pump in order to pump liquid to the grinder, an effluent discharge switch to reverse said pump and a holding switch to actuate said timer motor.

7. Apparatus according to claim 6 in which a switch is provided for actuating said timer motor, said switch being actuated by a flush pedal, and in which an aneroid is provided for disabling said timer system at relatively higher atmosphere pressures corresponding to low altitudes.

8. A sewage treatment system according to claim 1 in which a selector valve is placed in said flushing conduit between the flushing reservoir and the pump, and in which a disinfectant conduit is connected to said selector valve and a disinfectant reservoir is connected to said disinfectant conduit, whereby in one position of said selector valve the disinfectant reservoir discharges into said flushing conduit, and in another position of said selector valve, the flushing reservoir discharges into said flushing conduit.

9. A sewage treatment system according to claim 1 in which a flush pedal is provided for contacting starting means for starting a flushing cycle, and in which said flush pedal is connected to said filter means for clearing said filter means of solids.

10. A sewage treatment system according to claim 1 in which means are provided for cleaning said filter means of solids.

11. A sewage treatment system comprising: a grinder for receiving and grinding sewage; a flexible receptacle; means for exposing one side of said receptacle to pressure of the atmosphere; slurry conduit means discharging from the grinder into the receptacle; a flushing reservoir; filtrate conduit means discharging from the receptacle into the flushing reservoir; filter means in said filtrate conduit and within said receptacle for filtering out solids; whereby solids are retained in said receptacle; a flushing conduit discharging from the flushing reservoir into the grinder; a reversible pump in said flushing conduit between said flushing reservoir; a selector valve in said flushing conduit between the flushing reservoir and the pump; a disinfectant reservoir; a disinfectant conduit interconnecting said disinfectant reservoir and the selector valve, whereby in one position of said selector valve the disinfectant reservoir discharges into said flushing conduit, and in another position of said selector valve the flushing reservoir discharges into said flushing conduit; an effluent conduit interconnecting the flushing reservoir to the flushing conduit between the grinder and the pump; a discharge conduit from the flushing conduit between the flushing reservoir and the selector valve; and timing means comprising: a timer motor, a cam shaft driven by said timer motor, cams on said cam shaft, and a switch actuated sequentially by each cam, there being a flushing switch for actuating said pump to pump liquid to the grinder, an effluent discharge switch to reverse said pump, a selector valve switch to change the selector valve to one or the other of its said positions, and a holding switch to actuate said timer motor.

12. A sewage treatment system according to claim 11 in which a source of electricity is connected by a first lead to said timer motor, said first lead including a starter switch for initiating a flushing cycle, and in which said power source is connected to one terminal of each of said switches.

References Cited in the file of this patent
UNITED STATES PATENTS

| | | |
|---|---|---|
| 553,994 | Lea et al. | Feb. 4, 1896 |
| 1,303,358 | Montgomery | May 13, 1919 |
| 1,666,515 | Sweetland | Apr. 17, 1928 |
| 1,948,125 | Nordell | Feb. 20, 1934 |
| 1,982,266 | Nordell | Nov. 27, 1934 |
| 2,144,386 | Nordell | Jan. 17, 1939 |
| 2,246,224 | Streander | June 17, 1941 |
| 2,724,837 | McPherson | Nov. 29, 1955 |
| 2,740,971 | Weekes | Apr. 10, 1956 |